United States Patent [19]

Lee et al.

[11] Patent Number: 4,574,149

[45] Date of Patent: * Mar. 4, 1986

[54] FLUORINATED ORGANOSILOXANE COPOLYMERS

[75] Inventors: Chi-Long Lee; Thomas F. Lim, both of Midland; Antony P. Wright, Rhodes, all of Mich.

[73] Assignee: Dow Corning Corporation, Midland, Mich.

[*] Notice: The portion of the term of this patent subsequent to Oct. 22, 2002 has been disclaimed.

[21] Appl. No.: 664,897

[22] Filed: Oct. 26, 1984

[51] Int. Cl.[4] .............................................. C08G 77/24
[52] U.S. Cl. ........................................ 528/42; 528/32; 528/39; 556/454
[58] Field of Search ............................. 528/32, 39, 42; 556/454

[56] References Cited

U.S. PATENT DOCUMENTS

| | | | |
|---|---|---|---|
| 3,328,349 | 6/1967 | Lentz | 528/12 |
| 3,511,788 | 5/1970 | Keil | 528/10 |
| 4,026,845 | 5/1977 | Kim et al. | 260/2.5 |
| 4,229,548 | 10/1980 | Sattlegger | 521/110 |
| 4,368,279 | 1/1983 | Modic et al. | 521/123 |

FOREIGN PATENT DOCUMENTS 2909443  9/1980  Fed. Rep. of Germany.
2911971  10/1980  Fed. Rep. of Germany.

*Primary Examiner*—Melvyn I. Marquis
*Attorney, Agent, or Firm*—Robert Spector

[57] ABSTRACT

A novel class of resinous organosiloxane polymers includes triorganosiloxy, fluorinated organosiloxy, $SiO_{4/2}$ and silicon-bonded hydroxyl groups. The fluorine-containing hydrocarbon radicals are bonded to silicon by means of a sequence of at least two methylene group. Preferred organosiloxane polymers stabilize the cellular structure of polydimethylsiloxane foams during curing.

5 Claims, No Drawings

FLUORINATED ORGANOSILOXANE COPOLYMERS

BACKGROUND OF THE INVENTION

Field of the Invention

BACKGROUND INFORMATION

This invention relates to a novel class of polyorganosiloxanes. More particularly, this invention relates to novel, fluorinated organosiloxane copolymers. The copolymers effectively stabilize the structure of partially cured foams prepared from moisture curable RTV polyorganosiloxane compositions.

Room temperature vulcanizable (RTV) polyorganosiloxane foams have been obtained by introducing a blowing agent into a one-part moisture curable RTV elastomeric composition. These types of compositions are well known, and are typically prepared by mixing together, in the absence of atmospheric moisture, at least one hydroxyl endblocked polydiorganosiloxane and at least one silane or siloxane containing three or more silicon-bonded hydrolyzable groups such as carboxyl, alkoxy, ketoximo, amido or aminoxy. The compositions can also include curing catalysts, fillers, adhesion promoters, pigments, flame retardants and other additives to modify the appearance and/or the properties of the cured elastomer.

A disadvantage of employing moisture curable RTV compositions for preparing foams is the relatively long time period required for the composition to cure to the extent that the foam becomes self supporting. Once the expansion due to the action of the blowing agent is substantially completed, the partially cured foam begins to collapse. In addition, liquid material drains from the foam and eventually forms a layer of solid rubber beneath the foam. The relatively high density of the resultant foams and the presence of appreciable amounts of solid rubber may more than offset the advantages of utilizing these foams for insulation, cushioning and other typical foam applications.

The problem of maintaining the structure of moisture curable polyorganosiloxane foams during curing has been addressed by F. Modic and B. Boudreau in U.S. Pat. No. 4,368,279, which issued on Jan. 11, 1983. Modic and Boudreau teach maintaining the initially produced foam under a vacuum of at least 600 mm of mercury for the time required for the foam to become self supporting. The one example of a moisture curable RTV composition in this patent discloses that following vigorous stirring of the composition, ambient pressure was gradually reduced to 10 mm of mercury over a period of 2 to 5 minutes and maintained at this level for 10 minutes.

While the application of vacuum to a foam during curing may be feasible for the formation of slab stock using a foam machine, it requires specialized equipment including vacuum pumps and a substantially air-tight chamber for preparing the foam. The use of vacuum would not be practical, or in some instances even feasible, if the foam is prepared at the location where it is to be installed, which can be at relatively remote sites. In such situations, it would be far more desirable to have all of the ingredients required to prepare the foam, including a blowing agent, packaged in a single container such as an aerosol can.

Foamable one-package RTV elastomeric compositions are disclosed in German Patent Publications Nos. 2,909,443 (published Sept. 18, 1980) and 2,911,971 (published Oct. 4, 1980), both of which are assigned to Perrenatorwerk Alfred Hagen GmbH. The compositions include a low boiling solvent and/or a compressed gas as the blowing agent and are packaged in a flexible container that is equipped with a valve. The container forms one part of a 2-compartment pressurizable dispensing package. The second compartment contains a compressed gas that supplies the pressure required to dispense the RTV composition from the package. In the exemplified composition, enough gas diffuses through the wall of the flexible container to act as a blowing agent for the foamable composition. The composition contains 50% by weight of chalk and 4% by weight of silica. This amount of filler is required to maintain the structure of the foam during curing, however the density of the cured foam is very high due to the large amount of filler present. U.S. Pat. No. 4,229,548, which issued on Oct. 21, 1980 to Sattlegger et al. discloses RTV compositions similar to those disclosed in the foregoing German Patent Publications, but teaches using pressurizable containers equipped with nonpermeable, flexible inner containers for the foamable compositions.

The prior art discloses additives for reducing the density of polyorganosiloxane foams prepared by the reaction of polydiorganosiloxanes containing silicon-bonded hydroxyl groups with curing agents containing silicon-bonded hydrogen atoms. U.S. Pat. No. 4,026,845, which issued to Y. K. Kim et al. on May 31, 1977, teaches known fluorine-containing surfactants for this purpose. The surfactants contain fluorinated carbon atoms, and include both organic and organosilicon compounds.

U.S. Pat. No. 3,511,788, which issued to J. Keil on May 12, 1970, discloses using a foam stabilizer to prepare foams from (1) organic liquids having surface tension values in contact with air at 25° C. of at least $2.2 \times 10^{-4}$ newtons per centimeter, or (2) organic plastisols containing a plasticizer and a vinyl resin such as polyvinyl chloride. The foam stabilizer is an organosiloxane copolymer containing $SiO_{4/2}$ units and units selected from $(CH_3)_3SiO_{\frac{1}{2}}$ and $Q(CH_3)_2 SiO_{\frac{1}{2}}$ where Q is defined as a "solubilizing" group that makes the copolymer at least partially compatible with the organic liquid or plastisol to be foamed. The patent teaches that examples of solubilizing groups that can be employed in the Q radical include carboxyl, ester, amide, amino, mercapto, halocarbon, nitrile, nitro, carbonyl and "higher hydrocarbon groups." Fluorocarbon groups are not specifically disclosed. Because polydimethylsiloxanes typically exhibit surface tension values below $2.2 \times 10^{-4}$ newtons per centimeter, using these polydimethylsiloxanes as a foamable material in combination with a foam stabilizer disclosed in the aforementioned Keil patent would be outside the scope of the invention defined in this patent.

U.S. Pat. No. 3,328,349, which issued to Charles Lentz on June 27, 1967, discloses benzene soluble copolymers consisting essentially of $(C_nF_{2n+1}CH_2CH_2)(CH_3)_2SiO_{0.5}$ units, where n has a value of from 1 to 10, and $SiO_{4/2}$ units. An average of from 0.3 to 1.0 fluorine-containing siloxane units are present per $SiO_{4/2}$ unit. Lentz teaches that the disclosed copolymers are useful defoaming agents. On the basis of this teaching, copolymers of the type disclosed by Lentz would not be considered likely candidates to stabilize the structure of partially cured polyorganosiloxane foams.

SUMMARY OF THE INVENTION

The present invention is based on the discovery of a novel class of resinous organosiloxane copolymers that include both trimethylsiloxy and fluorinated organosiloxy groups in addition to $SiO_{4/2}$ and silicion-bonded hydroxyl groups. These copolymers effectively stabilize the cellular structure of partially cured polyorganosiloxane foams formed from moisture curable RTV elastomeric compositions and inhibit the drainage of liquid material from the foams.

DETAILED DESCRIPTION OF THE INVENTION

The resinous benzene-soluble organosiloxane copolymers of this invention consist essentially of (a) repeating units of the formulae $SiO_{4/2}$; $R(CH_3)_2SiO_{\frac{1}{2}}$; and units of the general formula $R'_{CH_2}CH_2Si_2(R'')_nO_{(3-n)/2}$ where R represents a saturated or ethylenically unsaturated hydrocarbon radical containing from 1 to 4 carbon atoms or a phenyl radical, R' represents a monovalent organic group containing at least 4 perfluorinated carbon atoms, R'' represents an alkyl radical containing from 1 to 3 carbon atoms or a phenyl radical and n is 0, 1 or 2; (b) silicon-bonded hydroxyl groups and, optionally (c) $(CH_3)_2SiO$ units. The molar ratio of all units in the copolymer other than silicon-bonded hydroxyl groups and $SiO_{4/2}$ units to said $SiO_{4/2}$ units is from 0.7:1 to 1.1:1, inclusive, and the concentration of silicon-bonded hydroxyl groups in said copolymer is up to 4.0% by weight. In preferred embodiments of the present copolymers, R is methyl and the molar ratio of $(CH_3)_3SiO_{\frac{1}{2}}$ units to said fluorine-containing units is such that.

(a) the surface tension exhibited by a 10% by weight solution of the copolymer in a hydroxyl endblocked polydimethylsiloxane exhibiting a viscosity of 0.08 Pa.s at 25° C. is less than $2.2 \times 10^{-4}$ newtons per cm at 25° C. when in contact with air, and
(b) optical clarity is achieved by the addition to said solution of from 0 to 100 percent by weight of o-xylene.

The aforementioned novel fluorinated organosiloxane copolymers areprepared using a method claimed in an application for Letters Patent Ser. No. 664,917, filed concurrently herewith in the names of Thomas Fay-Oy Lim and Anthony Pope Wright, now U.S. Pat. No. 4,549,003, entitled "Method for Preparing Novel Fluorinated Organosiloxane Copolymers." This method comprises the steps of (I) heating at a temperature of from 50° C. to the boiling point thereof a liquid reaction mixture comprising, (A) a fluorinated silane of the formula $R'CH_2CH_2Si(R'')_nX_{3-n}$; (B) a nonfluorinated benzene soluble organosiloxane copolymer comprising repeating units of the formulae $R(CH_3)_2SiO_{\frac{1}{2}}$ and $SiO_{4/2}$ in a molar ratio of from 0.6:1–1.1:1, respectively, and at least 0.1% by weight of silicon-bonded hydroxyl groups; (II) continuing heating of said liquid reaction mixture for a period sufficient to form said fluorine-containing organosiloxane copolymer, and (III) removing any acidic by products generated during the reaction of (A) and (B), where R, R' R''' and n are as defined hereinabove and X represents a hydrolyzable group.

The hydrocarbon radical represented by R can be saturated or ethylenically unsaturated and contains from 1 to 4 carbon atoms. R can be, for example, methyl, ethyl, vinyl, allyl or propyl. Alternatively, R can be phenyl.

The fluorinated organic group represented by R' in the foregoing formula contains at least 4 perfluorinated carbon atoms, and can also include partially fluorinated and nonfluorinated carbon atoms. The atoms that constitute the R' groups can be present as linear chains, branched chains or as carbocyclic rings that may contain one or more double bonds between adjacent carbon atoms. The fluorinated carbon atoms can be adjacent to one another or separated by nonfluorinated carbon atoms, atoms such as nitrogen, oxygen or sulfur, or by divalent groups such as carbonyl, amido, carboalkoxy, sulfonamido and other groups that do not hydrolyze readily in the presence of atmospheric moisture, or under the reaction conditions employed to prepare the organosiloxane copolymers of this invention. R' can contain from 4 to 20 or more carbon atoms. Preferably R' contains from 4 to 16 carbon atoms.

The molar ratio of units other than hydroxyl and $SiO_{4/2}$ to the $SiO_{4/2}$ units in the present copolymers is from 0.7:1 to 1.1:1, inclusive. For preferred embodiments, that are particularly effective polyorganosiloxane foam stabilizers, this ratio is from 0.7:1 to 0.9:1, inclusive.

The present copolymers can be prepared by reacting a fluorinated silane (A) of the general formula $R'CH_2CH_2Si(R'')_nX_{3-n}$, where R',R'', X and n are as previously defined, with a nonfluorinated organosiloxane copolymer (B) described hereinbefore. These copolymers can optionally contain up to about 10 mole percent, based on $SiO_{4/2}$ units, of $R_2SiO$ units.

The group represented by X in the foregoing formula for (A) can be a halogen atom, such as chlorine, or a hydrolyzable group such as alkoxy, amido or acyloxy. Preferably X is halogen, based on the availability of these silanes.

Copolymers of the type useful as (B) and methods for their preparation are described in U.S. Pat. No. 2,676,182, which issued to Daudt and Tyler on Apr. 20, 1954. This patent is incorporated herein by reference as a teaching of organosiloxane copolymers suitable as reactant (B) for preparing the present copolymers. In accordance with Daudt and Tyler's teaching, a silica hydrosol is neutralized using a chlorosilane or the combination of sufficient acid to achieve a pH of 5 or less with either an alkoxysilane or a siloxane. The organosilicon layer of the resultant two-phase composition is then washed free of acid and dried to yield the final product as a viscous oil or thermoplastic resin, depending upon the organic groups present on the organosilicon reactant.

Reactant (A), a fluorinated silane or a partial hydrolysate thereof can be prepared by hydrosilation of a fluoroolefin of the formula $R'CH=CH_2$ with a substantially equimolar quantity of a hydrogen-containing nonfluorinated silane of the formula $HSi(R'')_nX_{3-n}$, where R'' and X are defined hereinbefore. Preferably R'' is methyl or phenyl, based on availability of these silanes. Most preferably R'' is methyl.

As disclosed hereinbefore, the radical represented by R' in the formulae for the fluoroolefin and reactant (A) is a monovalent organic radical containing at least four perfluorinated carbon atoms. Partially fluorinated or nonfluorinated carbon atoms can be present so long as R contains at least four perfluorinated carbon atoms.

Fluoroolefins containing a variety of fluorocarbon radicals corresponding to R′ in the foregoing formulae are commercially available or can be synthesized with a minimum of experimentation using procedures disclosed in patents and other published literature. R′ preferably represents F $(C_mF_{2m})$, based on the availability of this type of fluoroolefin, and m has an average value from 4 up to 20 or more, inclusive.

One particularly preferred type of fluoroolefin is available from E. I. DuPont deNemours and Co., Wilmington, Del., as a mixture of homologous compounds exhibiting the average formula $F(CF_2)_pCH=CH_2$, where p is an even integer from 6 to 14, inclusive in each of the fluoroolefin molecules. Typically, homologs where p is 6, 8, 10 and 12 constitute at least 95% by weight of the mixture. Some samples of this type of olefin may contain sufficient iodine to interfere with a hydrosilation reaction. In such instances, it is often desirable to remove at least a portion of the iodine by refluxing the olefin over finely divided metallic zinc and distilling it prior to reacting it with the hydrogen-containing silane.

Hydrosilation reactions are typically conducted at temperatures of from about 90° to about 300° C. using a platinum group metal, a compound thereof, such as chloroplatinic acid, or an organic peroxide as the catalyst. The hydrosilation of fluorinated olefins is disclosed in U.S. Pat. No. 3,620,992, which issued to Kim and Pierce on Nov. 16, 1971 and is incorporated herein in its entirety by reference as a teaching of a general method for preparing fluorosilanes.

The hydrosilation reaction between any of the fluoroolefins described hereinabove and the hydrogen-containing silane $HSi(R'')_nX_{3-n}$ can be conducted using substantially equimolar amounts of the two reactants, based on the average molecular weight of the fluoroolefin. In some instances a higher yield of fluorosilane can be obtained by conducting the reaction under superatmospheric pressure in a sealed vessel, such as a glass tube or autoclave, which is heated at temperatures of from 90° to 250° C. for several hours. This is particularly true if the fluoroolefin or silane contains impurities that inhibit or otherwise adversely affect the activity of the hydrosilation catalyst.

The fluorinated silane (A) obtained from the hydrosilation reaction is reacted with the organosiloxane copolymer (B) described hereinbefore. The content of silicon-bonded hydroxyl groups in (B) is preferably from 2 to 7%, based on the weight of the copolymer. Because the copolymer is a resinous solid at ambient temperature, it is preferably dissolved in a liquid aromatic hydrocarbon such as benzene, toluene or a mixture of isomeric xylenes prior to being reacted with (A). The optimum balance between viscosity of the reaction mixture, reaction rate and the size of the reactor required is achieved at copolymer concentrations of from 20 to about 80%, based on the total weight of the liquid reaction medium. Liquid aromatic hydrocarbons are preferred reaction media because they are solvents for both (A) and (B) in addition to forming an azeotropic mixture with any water present in the reaction mixture.

The relative amounts of (A) and (B) used to obtain the present copolymers will depend upon the fluorine content required for the copolymer. The maximum amount of (A) that can be reacted is limited by the hydroxyl content of (B). Preferably at least 0.1 gram molecular weight of (A) is present for each gram molecular weight of (B). Most preferably from 1 to 3 gram moles of (A) is reacted with a gram molecular weight of (B). The molecular weight of (B) is conveniently determined using gel permeation chromatography. Preferred embodiments of (B) exhibit gram molecular weights of from 3000 to 5000 grams per mole using this method.

Reactants (A) and (B) will react in the absence of a catalyst at elevated temperatures, however it is generally desirable to employ one of the known acidic catalysts for condensation reactions of hydroxyl-containing organosiloxanes. A preferred class of catalysts includes the alkanesulfonic acids, most preferably those containing at least one fluorine atom per molecule, such as trifluoromethanesulfonic acid. From 0.01 to 1.0% by weight of a preferred catalyst, based on the combined weights of (A) and (B) will usually provide the level of catalytic activity required to obtain at least an 80% yield of the desired reaction product following heating of the reaction mixture at temperatures of from 50° C. to the boiling point for time periods of from 30 minutes to several hours.

Following the reaction period, any acid present in the reaction mixture is removed. This is conveniently accomplished by treating the reaction mixture with an amount of a basic material to neutralize substantially all of the hydrogen halide or other acid generated as a by-product of the reaction of (A) and (B). Basic alkali metal- or alkaline earth metal salts such as sodium- or calcium bicarbonate are preferred. The salt which forms is at most only slightly soluble in the reaction mixture and is conveniently removed by filtration. The resulting filtrate contains a fluorinated organosiloxane copolymer of this invention.

The acid-free reaction mixture may not require any additional processing other than removal or addition of solvent if the copolymer is to be used as a coating or encapsulating material. Other end use applications of the present copolymers, including foam stabilizers, may require replacing at least a portion of the liquid hydrocarbon or other reaction medium with a less volatile solvent for the copolymer. If the copolymer is to be used to stabilize a foam produced by introducing a gaseous blowing agent into a composition including a liquid polydimethylsiloxane in accordance with one aspect of this invention, preferred solvents include liquid trimethylsiloxy- or hydroxyl-endblocked polydimethylsiloxanes exhibiting viscosities of from 0.001 to about 0.1 Pa.s at 25° C.

The following examples disclose preferred embodiments of the present copolymers and their use as polyorganosiloxane foam stabilizers. The examples should not be interpreted as limiting the scope of this invention as defined in the accompanying claims. All parts and percentages are by weight unless otherwise indicated.

EXAMPLE 1

Four mixtures of homologous fluorinated organosiloxane copolymers of this invention, designated hereinafter as I, II, III and IV, were prepared by reacting a nonfluorinated organosilane copolymer of the type described by Daudt and Tyler in Example 3 of the aforementioned U.S. Pat. No. 2,676,182 with a mixture of homologous fluorosilanes of the general formula $F(CF_2)_nCH_2CH_2Si(CH_3)_pCl_{3-p}$ where n represents 6, 8, 10 or 12, the average value of n in the mixture was 8 and p was 0, 1 or 2. The nonfluorinated organosilane copolymer, identified hereinbefore as reactant (B), contained $(CH_3)_3SiO_{\frac{1}{2}}$ units and $SiO_{4/2}$ units in a molar ratio of about 0.7:1, respectively, and 3.1% by weight of hydroxyl groups, exhibited a molecular weight of 4200, determined by gel permeation chromatography, and was introduced into the reaction mixture as a 75% by weight solution in isomeric xylenes.

Three fluorosilanes, where p of the foregoing formula was 0, 1 or 2, were prepared by reacting a mixture of homologous fluoroolefins of the general formula $F(CF_2)_nCH=CH_2$ with a silane of the general formula $H(CH_3)_pSiCl_{(3-p)}$, where n and p are defined hereinabove.

The preparation of each of the four fluorinated copolymers is described in detail hereinbelow:

Copolymer I—Reaction product of $F(CF_2)_nCH_2CH_2Si(CH_3)_2Cl$ (A) with the organosiloxane copolymer (B) in a 1:1 molar ratio.

A sample of a mixture of homologous olefins $F(CF_2)_nCH=CH_2$ received from E. I. DuPont deNemours and Co. was distilled under reduced pressure to yield a purified mixture wherein in each of the molecules n of the foregoing formula had the value 6, 8, 10 or 12. The average molecular weight of the purified mixture, determined from a vapor phase chromatogram was 422 g./mol. A 42.2 g. portion of the purified mixture was reacted in a sealed glass tube with 12.3 g. of dimethylchlorosilane and 4 drops of an isopropanol solution of chloroplatinic acid (equivalent to $1 \times 10^{-4}$ mole of platinum per mole of fluorinated olefin). The tube was heated at a temperature of 110° C. for 20 hours to yield a fluorinated silane (1). A second sample of fluorinated silane (2) was prepared in a similar manner using 87.7 g. of the fluoroolefin, 28.4 g. of dimethylchlorosilane and 20 drops of the chloroplatinic acid solution. In this instance the reaction mixture was heated for 2 days at 110° C. Samples (1) and (2) were combined and distilled under reduced pressure. The distillate boiling from 92° C. at 2.9 kPa to 122° C. at 0.26 kPa was collected and analyzed by vapor phase chromatography. It was found to contain about 19% by weight of unreacted olefins. The average gram molecular weight of the silane portion was calculated to be 522.8 g. A 22.0 g. portion of the distillate, equivalent to 34.1 mmol, was combined with 200 g. (35.7 mmol) of a 75% by weight xylene solution of the organosiloxane copolymer described hereinabove in this example, 0.021 g. of trifluoromethanesulfonic acid and 200 g. of toluene. The resultant mixture was heated for 1 hour at 60° C., at which time a 100 g. portion was removed and neutralized using 0.13 g. of sodium bicarbonate. A 40 g. portion of a trimethylsiloxy endblocked polydimethylsiloxane exhibiting a viscosity of 0.02 Pa.s at 25° C. was then added and the resultant mixture was concentrated by heating under the vacuum produced by a mechanical vacuum pump until the temperature of the reaction mixture reached 100° C. The residue was a 50% by weight solution of copolymer I in a trimethylsiloxy endblocked polydimethylsiloxane.

Copolymer I consists essentially of repeating units corresponding to the formulae $(CH_3)_3SiO_{\frac{1}{2}}$, $SiO_{4/2}$, units of the average formula $F(CF_2)_8CH_2CH_2Si(CH_3)_2O_{\frac{1}{2}}$ and silicon-bonded hydroxyl groups. The molar ratio of the combination of $(CH_3)_3SiO_{\frac{1}{2}}$ and $F(CF_2)_8CH_2CH_2OSiO_{3/2}$ units to the $SiO_{4/2}$ units was within the range of from 0.7:1 to 1.1:1 and the concentration of silicon-bonded hydroxyl groups in the copolymer was within the range from 0.4 to 4.0 weight percent, based on the weight of the copolymer.

Copolymer II—Reaction product of $F(CF_2)_nCH_2CH_2Si(CH_3)Cl_2$ with the organosiloxane copolymer in a 1:1 molar ratio.

A mixture of $F(CF_2)_nCH=CH_2$ homologs was distilled as described in the foregoing procedure for Copolymer I. The distilled olefin was then combined with 8% by weight of zinc dust and heated at about 80° C. for one hour, at which time the liquid portion was distilled under reduced pressure. The fraction boiling from 54° C. at 8.4 kPa to 120° C. at 4.7 kPa was collected and analyzed by vapor phase chromatography. The fraction was found to contain 34% of $F(CF_2)_6CH=CH_2$, 37% of $F(CF_2)_8CH=CH_2$, 22% of $F(CF_2)_{10}CH=CH_2$ and 4% of $F(CF_2)_{12}CH=CH_2$. The calculated average molecular weight of the fraction was 442. Three 64.5 g. (146 mmole) portions of this distillate were each reacted in a sealed tube with 23 g (200 mmoles) of methyldichlorosilane in the presence of 200 μl of the chloroplatinic acid solution described in the first part of this Example. The tubes were heated for 15 hours at 115° C. The resultant products were combined and distilled under reduced pressure. The fraction boiling from 71° C. at 2.9 kPa to 150° C. at 0.13 kPa was collected and analyzed by vapor phase chromatography. The fraction amounted to an 86% yield, based on the olefin, and exhibited an average molecular weight of 544 g/mol. The fraction was found to contain 38% of the $F(CF_2)_nCH_2CH_2Si(CH_3)Cl_2$ homolog where n=6, 35% of the n=8 homolog, 19% of the n=10 homolog and 4% of the n=12 homolog. A 20.4 g portion of this fraction, equivalent to 37.5 mmol, based on its average molecular weight, was reacted with 200 g (35.7 mmol, based on molecular weight of 4200) of a 75% by weight xylene solution of the nonfluorinated organosiloxane polymer (described hereinbefore in this Example) in the presence of 100 g of toluene and 0.1 g trifluoromethanesulfonic acid using the procedure described in the foregoing procedure for preparing Copolymer I. A 3.0 g portion of sodium bicarbonate and 50 g of the polydimethylsiloxane exhibiting a viscosity of 0.02 Pa.s were used to obtain the final solution of Copolymer II. Volatile materials were removed by heating the resultant mixture under the vacuum produced by a mechanical vacuum pump until the temperature of the mixture reached 100° C.

Copolymer III—Reaction product of $F(CF_2)_nCH_2CH_2Si(Me)Cl_2$ with the organosiloxane copolymer in a 3:1 molar ratio.

Copolymer III was prepared using the same procedure and reactants described hereinbefore in connection with Copolymer II. The only difference was that 61.2 g (107 mmol) of the fluorinated silane $F(CF_2)_nCH_2CH_2Si(Me)Cl_2$ was reacted with 200 g. of the organosiloxane copolymer solution.

Copolymers II and III consisted essentially of repeating units of the formulae $(CH_3)_3SiO_{\frac{1}{2}}$ and $SiO_{4/2}$, units of the average formula $F(CF_2)_8CH_2CH_2Si(Me)O$, and silicon-bonded hydroxyl groups. The molar ratio of the combination of $(CH_3)_3SiO_{\frac{1}{2}}$ and $F(CF_2)_8CH_2CH_2SiO_{3/2}$ units to $SiO_{4/2}$ units was within the range of from 0.7:1 to 1.1:1 and the concentration of silicon-bonded hydroxyl groups in the copolymer was within the range from 0.4 to 4.0 weight percent, based on the weight of the copolymer.

Copolymer IV—Reaction product of $F(CF_2)_nCH_2CH_2SiCl_3$ with a nonfluorinated organosiloxane copolymer in a 1:1 molar ratio.

Two samples of the fluorinated homologous silanes F(CF$_2$)$_n$CH$_2$CH$_2$SiCl$_3$ were obtained as described for the preceding Copolymers I, II and III by reacting 64.5 g. (0.15 mmol) of the fluoroolefin mixture used for Copolymer II in a sealed tube with 24.4 g. (0.18 mmol) of trichlorosilane and 200 μl of the chloroplatinic acid solution described hereinbefore in this Example. The sealed tube was heated for 16 hours at 115° C. The two yields of products were combined and distilled under reduced pressure. The fraction boiling from 71° C. and 2.9 kPa to 135° C. and 0.13 kPa was collected and analyzed by vapor phase chromatography. The distillate represented an 83% yield, based on starting reactants, and exhibits an average molecular weight of 573 g./mol. A 20.4 g. (35.6 mmol) sample of the distillate was reacted with 200 g. (35.7 mmol) of the organosiloxane copolymer solution used to prepare the copolymers I, II and III and 0.1 g. of trifluoromethanesulfonic acid. The procedures for preparing and isolating the final copolymer are described hereinbefore for Copolymer II. Copolymer IV consisted essentially of the same units as Copolymers I, II and III, with the exception that the fluorine-containing units were of the average formula F(CF$_2$)$_8$CH$_2$CH$_2$SiO$_{3/2}$.

A ten weight percent solution of copolymer I, II, III or IV in a hydroxyl endblocked polydimethylsiloxane exhibiting a viscosity of 0.08 Pa.s at 25° C. had a surface tension value in contact with air of less than 2.2×10$^{-4}$ newtons at 25° C. and required less than 100% by weight of o-xylene, based on the weight of said solution, to achieve optical clarity.

EXAMPLE 2

This example demonstrates the utility of Copolymers I–IV described in the foregoing Example 1 as stabilizers for foams prepared by the action of a blowing agent (isobutane) on a moisture curable polyorganosiloxane composition.

The foamable polyorganosiloxane compositions contained the following ingredients:

(1) 100 parts of a hydroxyl endblocked polydimethylsiloxane exhibiting a viscosity of 15 Pa.s,
(2) 5 parts of CH$_3$Si[ON=C(CH$_3$)(C$_2$H$_5$)]$_3$,
(3) 5 parts of a 50% by weight solution of copolymer I, II, III or IV described hereinabove,
(4) 0.2 parts of dibutyltin dilaurate and
(5) 15 parts of isobutane as the blowing agent.

Ingredient (1) was placed in a Sem Kit ®tube (commercially available from Semco, Inc., Division of Products Research and Chemical Corporation, Glendale, Calif.). This device is a cylinder formed from polyethylene, resembles a tube commonly used to package caulking compounds and incorporates a means for adding ingredients and stirring the contents of the tube with the exclusion of atmospheric moisture.

Ingredient (1) was deaired, following which (2) and (3) were added and a cover placed on the rear of the tube. Ingredient (4) was then introduced using a hypodermic syringe and the resultant formulation was mixed for 3 minutes, at which time the mixture was transferred into a conventional one-compartment aerosol can without coming into contact with atmospheric moisture. The valve assembly was then placed on the can and the contents of the can were degassed under reduced pressure prior to attachment of the valve assembly to the can by crimping. Liquified isobutane (5) was then introduced through the valve and the can was shaken by hand for 1 minute to distribute the blowing agent homogeneously throughout the composition.

Foams were prepared by discharging a portion of the contents of the can into a small glass cosmetic jar to a depth of about 1.3 cm. When the foam had cured a sample of known volume was cut out and weighed to determine density, the cell size range was measured using a magnifying rule, and the percent collapse was calculated using the formula [(h$_i$−h$_f$)/h$_i$]×100, where h$_i$ and h$_f$ represent, respectively, the initial height of the dispensed foam and the height of the cured foam. The percent by volume of cured rubber present in the final foam was as determined. All of these values are reported in the following table.

| Copolymer | Density (g/cc) | % Collapse | Cell Size (mm) | Volume % of Foam |
|---|---|---|---|---|
| I | 0.40 | 53 | 0.2–2.8 | 80 |
| II | 0.36 | 67 | 0.2–1.2 | 80 |
| III | 0.38 | 66 | 0.1–0.8 | 87 |
| IV | 0.32 | 67 | 0.2–2.8 | 85 |

A foam prepared using the foregoing ingredients (1), (2), (4) and (5) without a foam stabilizer collapses substantially completely shortly after being dispensed from the container. The cured product is a rubber containing a few widely dispersed bubbles.

That which is claimed is:

1. A resinous, benzene-soluble organosiloxane copolymer consisting essentially of (a) repeating units of the formulae SiO$_{4/2}$; R(CH$_3$)$_2$SiO$_{\frac{1}{2}}$; and units of the general formula R'CH$_2$CH$_2$Si(R")$_n$O$_{(3-n)/2}$ where R represents a saturated or ethylenically unsaturated hydrocarbon radical containing from 1 to 4 carbon atoms or a phenyl radical, R' represents a monovalent organic group containing at least 4 perfluorinated carbon atoms, R" represents an alkyl radical containing from 1 to 3 carbon atoms or a phenyl radical; (b) silicon-bonded hydroxyl groups; and, optionally (c) R$_2$SiO units; n is 0, 1 or 2, the molar ratio of all units in the copolymer other than silicon-bonded hydroxyl groups and SiO$_{4/2}$ units to said SiO$_{4/2}$ units is from 0.7:1 to 1.1:1, inclusive, and the concentration of silicon-bonded hydroxyl groups in said copolymer is up to 4.0% by weight.

2. A copolymer according to claim 1 where R is methyl and the molar ratio of (CH$_3$)$_3$SiO$_{\frac{1}{2}}$ units to said fluorine-containing units is such that
(a) the surface tension exhibited by a 10% by weight solution of the copolymer in a hydroxyl endblocked polydimethylsiloxane exhibiting a viscosity of 0.08 Pa.s at 25° C. is less than 2.2×10$^{-4}$ newtons per centimeter when measured in contact with air at 25° C., and
(b) optical clarity is achieved by the addition to said solution of from 0 to 100 percent by weight of o-xylene.

3. A copolymer according to claim 1 where R' is F(C$_m$F$_{2m}$) where m has an average value of at least 4.

4. A copolymer according to claim 1 where R' is F(CF$_2$)$_p$— and p represents an even integer where the values of p in the fluorine-containing units comprising said copolymer are identical or different and the average value of p is from 6 to 14, inclusive.

5. A copolymer according to claim 1 where R and R" are methyl.

* * * * *

UNITED STATES PATENT AND TRADEMARK OFFICE
CERTIFICATE OF CORRECTION

PATENT NO. : 4,574,149

DATED : 3-4-86

INVENTOR(S) : Chi-Long Lee, Thomas Fay-Oy Lim, Antony Pope Wright

It is certified that error appears in the above-identified patent and that said Letters Patent is hereby corrected as shown below:

Column 3, line 20 - Delete "$R'_{CH2}CH_2Si_2(R'')_nO_{(3-n)/2}$"

and substitute therefor -- $R'CH_2CH_2Si(R'')_nO_{(3-n)/2}$ -- .

Column 3, line 50 - Change "Anthony" to read -- Antony -- .

Signed and Sealed this

Thirty-first Day of March, 1987

*Attest:*

DONALD J. QUIGG

*Attesting Officer*  *Commissioner of Patents and Trademarks*